US011548223B2

(12) United States Patent
Alouani

(10) Patent No.: US 11,548,223 B2
(45) Date of Patent: Jan. 10, 2023

(54) TOOLING SYSTEM WITH A SYSTEM TOOL DISPLACEABLE ALONG A CLOSED PATH

(71) Applicant: TOREM LABS, Laval (CA)

(72) Inventor: Adel Alouani, Laval (CA)

(73) Assignee: TOREM LABS, Laval (CA)

( * ) Notice: Subject to any disclaimer, the term of this patent is extended or adjusted under 35 U.S.C. 154(b) by 64 days.

(21) Appl. No.: 17/344,156

(22) Filed: Jun. 10, 2021

(65) Prior Publication Data

US 2021/0387412 A1 Dec. 16, 2021

Related U.S. Application Data

(60) Provisional application No. 63/037,065, filed on Jun. 10, 2020.

(51) Int. Cl.
*B29C 64/241* (2017.01)
*B33Y 30/00* (2015.01)
*B29C 64/182* (2017.01)
*B23K 26/08* (2014.01)
*B23K 26/34* (2014.01)

(52) U.S. Cl.
CPC ........ *B29C 64/241* (2017.08); *B23K 26/0876* (2013.01); *B23K 26/34* (2013.01); *B29C 64/182* (2017.08); *B33Y 30/00* (2014.12)

(58) Field of Classification Search
CPC .............................. B29C 64/209; B29C 64/241
See application file for complete search history.

(56) References Cited

U.S. PATENT DOCUMENTS

| 8,778,252 B2 | 7/2014 | Mackie et al. |
| 10,065,354 B2 | 9/2018 | O'Neil |
| 10,821,514 B2 | 11/2020 | Corsmeier |
| 2015/0017272 A1 | 1/2015 | Donaldson et al. |
| 2015/0140147 A1 | 5/2015 | Konstantinos et al. |
| 2015/0183167 A1* | 7/2015 | Molinari ............... B29C 64/336 |
| | | 425/375 |
| 2016/0339542 A1* | 11/2016 | Paetz ...................... B22F 12/50 |
| 2017/0348902 A1* | 12/2017 | Ohara .................... B33Y 30/00 |
| 2018/0099453 A1* | 4/2018 | Cambron ............... B33Y 30/00 |
| 2019/0022937 A1 | 1/2019 | Stelter et al. |
| 2019/0351617 A1 | 11/2019 | Heston et al. |
| 2020/0307084 A1 | 10/2020 | Kajita et al. |

FOREIGN PATENT DOCUMENTS

| KR | 20170015442 A | * | 2/2017 | .......... B29C 64/209 |
| WO | 2019/071099 A1 | | 4/2019 | |

* cited by examiner

*Primary Examiner* — Manley L Cummins, IV
(74) *Attorney, Agent, or Firm* — Praxis

(57) ABSTRACT

A tooling system, such as an additive manufacturing system, includes a tool displacement mechanism mounted on a fixed structure and carrying a system tool such as a printhead. The tool displacement mechanism displaces the system tool along a curvilinear closed path about a system axis and located within a working plane intersecting the system axis. A bed, connecting to the fixed structure, is substantially positioned within the working plane, locally adjacent the closed path and along at least a portion of the closed path.

19 Claims, 7 Drawing Sheets

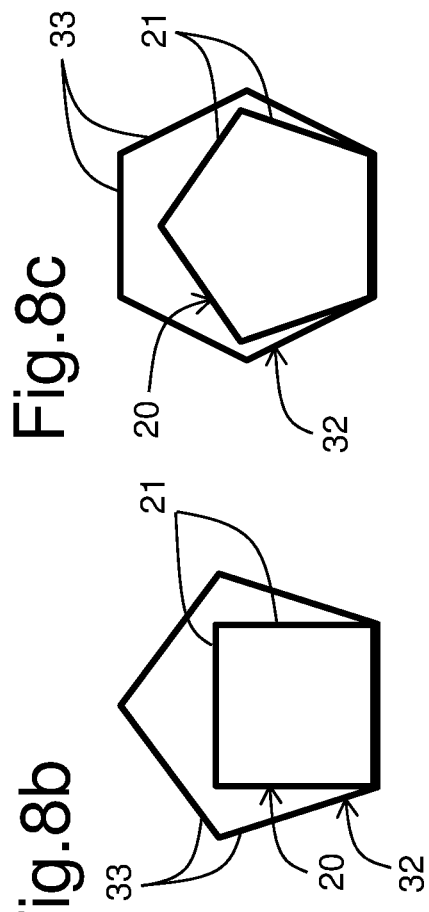
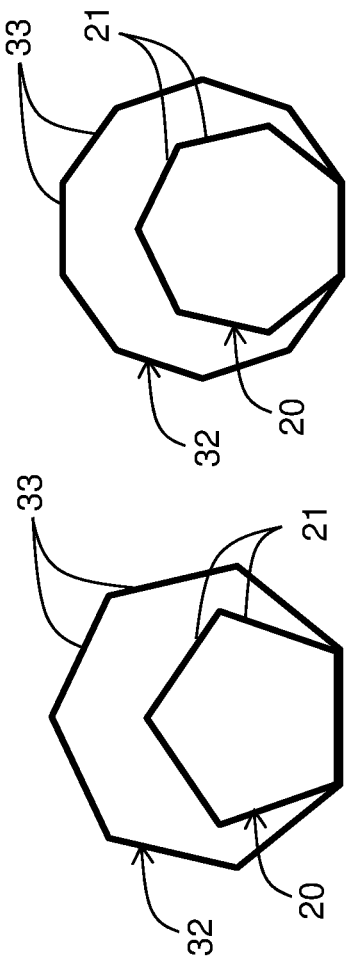

TOOLING SYSTEM WITH A SYSTEM TOOL DISPLACEABLE ALONG A CLOSED PATH

CROSS REFERENCE TO RELATED APPLICATIONS

The present application claims the benefit of U.S. provisional patent application No. 63/037,065, filed on Jun. 10, 2020, and which is incorporated herein by reference.

FIELD OF THE INVENTION

The present invention relates to tooling systems, and more specifically to tooling system having a system tool being displaceable along a closed path, such as a 3D printing (or additive manufacturing) system with a displaceable/rotating printhead, a scanning system with a displaceable scanning head, a deposition or transfer system, or the like.

BACKGROUND OF THE INVENTION

Additive manufacturing is the process of building objects layer by layer. There are different technologies of layer deposition and layer forming ranging from Fused Deposition Modeling (FDM), to Selective Laser Sintering (SLS), and Stereo Lithography Apparatus (SLA), to only name a few. These additive methods employ different processes to fuse and add two dimensional layers together to form 3D (3-dimensional) objects. Sometimes multiple materials can be used on the same machine, such as to make a removable support, or to simply add different properties to the objects such as stiffness, color, conductivity, etc. Deposited materials range from plastics to metals and concrete, and even materials of biological nature. Sizes of the printed models or objects can vary, and resolution can vary as well. Additive manufacturing brings huge potential for innovation as well as changing the way products are manufactured. More recently, the technology has advanced to a point where it is considered mature enough for prototyping and validation of designs and is starting to be used in more demanding manufacturing applications. There are many challenges in making this manufacturing method widespread and it is due to multiple factors such as materials, speed, quality, and cost.

A 3D printer works in three dimensions and all depositions work around the interaction of each dimension with one another. Here is a look at the most known Cartesian FDM 3D printers. One can see the approach of depositing material as a 1-dimensional (1D) operation. A 1D line of plastic is deposited on a 2-dimensional (2D) plane of a certain layer height. Once the 2D plane has been completed, the next 2D plane can be deposited, again using a 1D line at a time and so on. The work of this 3D printer is therefore to go from one dimension to two dimensions and then the third. Each 1D step of this process is time being wasted on movement and one can easily see why FDM Cartesian printers are so slow. This also introduces a lot of movements to the head that is painstakingly depositing every feature, one line at a time. Even if the head moves fast, it will always be limited by the back-and-forth movements required in the 2D plane. Similarly, in SLA and SLS 3D printing, a focused laser point is moved on a plane with the control of the angle of mirrors. The advantage of this method compared to FDM is that the point light has no mass, the source does not need to move, and only the angular inertia of the mirror assembly is the limiting factor. Nevertheless, it remains an optimized 1D problem, same as in the Cartesian type FDM. The fact that this requires sometimes specially developed and pre-processed materials in the shape of filament, or specially synthesized resins is also bothersome. This optimization is difficult to achieve with the more readily available and diverse plastic filaments.

More recent advancement in SLA methods have finally brought the method to another level by using LCDs or projectors to control all the points of a surface at almost the same time. This method has the right idea as it is solving the 1D constraint explained above, by making the points available at any instant. The limiting factor at this point becomes the refresh rate of the 2D projection and the material's ability to become ready to be deposited for the next layer. Some SLA printers need to use a wiping mechanism to lift the part and create the space for the next layer. Sometimes this creates unwanted suction which can result in part deformation or a failed print. Other companies, like Carbon, Inc.™, developed special methods and chemical processes to get rid of the back-and-forth motion of the wiper and the bed by having a chemically inactive zone above the projection window. This greatly reduces time and even allowed for higher quality as the refresh rate of the 2D projection became the limiting factor to layer height, making it an almost layer-less process. In short, the layer height had become coupled to the ability of the projection to change each point or pixel fast enough. There are other limitations such as in the chemical process and heat generation, but the principle of operation allowed to take advantage of the shortcut on going directly from 1D to 2D. Unfortunately, this method only works for the SLA type 3D printers with a very limited range of materials.

Nevertheless, there is still viable options to try as seen in the literature. One particular idea with potential is the one of transforming alternate movements into continuous ones. For example, by modifying the Cartesian FDM printers (See PCT patent application publication No. WO 2019/071099 A1), people switched to polar coordinates to allow for more continuous deposition which allows for fewer unidirectional accelerations. This was an interesting idea because one could imagine building a vase continuously without moving the head much. The useful applications are limited, and essentially remains with revolving geometries, such as a vase, a rocket engine nozzle, and the like. But the problem of 1D deposition is still the aspect slowing it down because only one point or line could be deposited at a time.

A particularly interesting method of deposition was disclosed more recently in use with electrophotography or Xerox™-like toner deposition. U.S. patent publication No. US 2015/0017272 A1 to Xerox Corporation and U.S. patent publication No. US 2019/0022937 A1 to Evolve Additive Solutions, Inc. described a method of depositing 2D planes on a rotary device using a fixed deposition head that deposits the material plane by plane, or line by line since only one line at a time is in contact with the cylinder. Although this solution answers to the 1-D printing limitations, as well as the continuous deposition method since a cylinder comes back to its start once it has made a full turn, it remains quite complex. First, the well-known 2D and square and flat layers cannot be used on such a device the same way we are used to. Second, the resolution of the first layer is smaller than the last layer per unit area, this means scaling must be performed or alternatively the cylinder rotational speed must be adjusted at each layer to preserve the correct aspect ratio. This solution is great but with some downsides in efficiency. As the cylinder grows, its rotational speed (RPM) must be limited because it will get unbalanced, especially the further it gets from the center of rotation.

There is more interesting work done by General Electric (see U.S. patent Ser. No. 10/821,514 B2) on to increase the speed and efficiency. A single tool is able to move radially on a plane and deposit/fuse the material in place on different platforms parallel to this plane. This enables a few advantages such as in manufacturing scenario where multiple parts and designs can come out of the same machine. This concept is interesting as it offers a glimpse into mass production using additive manufacturing. Even though this method is applied on the SLS type of additive manufacturing, the concept can be adapted and played with. To finish on this point, there are some limitations in terms of resolution with respect to the radial position. One is constrained around the platform and the space closer to the center becomes inefficient.

One more step, close but not quite, no rotating (circumferentially fixed) printhead, and rotating no separate platforms as shown in US patent publication No. US 2020/0307084 A1.

Accordingly, there is a need for an improved tooling system having a system tool being displaceable along a closed path.

SUMMARY OF THE INVENTION

It is therefore a general object of the present invention to provide an improved tooling system having a system tool being displaceable along a closed path that obviates at least one of the above-noted drawbacks.

The invention in question mitigates all those factors and enhances each additive manufacturing technology by proposing a platform of operation for depositing materials in a continuous manner per layer with a focus on manufacturing output and continuous operation. The present invention can be applied to most additive manufacturing methods because it optimizes the three-dimensional operations required to make a 3D object while allowing the decoupling of one of the dimensions to allow uninterrupted operation.

In addition, the present invention has been developed to keep the same advantages of the solution presented above, being the shortcut of fast 2D plane deposition and a deposition in a continuous manner as to not induce unnecessary acceleration, but using innovative arrangements of the different elements of the system allows the printing process to become streamlined (via continuous—limiting or avoiding back-and-forth/stop-and-go as much as possible because of dynamic inertia—displacement of the printhead) while allowing it to be fully customizable depending on the user's needs.

An advantage of the present invention is that the tooling system can have one or multiple system tools, such as printheads or transfer heads placed on a rotating carousel defining a closed path, and one or multiple platforms moving radially and independently away from the carousel. First a deposition or transfer head is placed on a rotating carousel. This allows the head to move continuously around without stopping unnecessarily. The head can be made of a deposition roller or belt as seen on the electrophotography deposition system. The head can also be one or more lines of equally spaced LEDs (Light Emitting Diodes) so as to project an image with one line at a time during rotation so as to be used in SLA style deposition. Additionally, another example would be of a head with multiple individually controlled extrusion holes on one or more lines can be controlled to deposit the standard filament plastic according to the radial position of the head and width control through extrusion factor can precisely control the lateral dimension (generally parallel to an axis of the rotating carousel) of a planar deposition. Finally, the head can be used as a transfer mechanism for layers generated elsewhere on the assembly, either inside the carousel, or in the place of other platforms. These are only a few examples to help illustrate the concept, but it is understood that there is great potential for adapting different existing technologies to this system.

Another advantage of the present invention is that the tooling system can have one or multiple deposition platforms placed adjacent or tangent to a portion of the carousel, so as to allow the tangentially passing head to deposit the first layer on that platform. The platform(s) can then move radially away after each head pass to allow deposition of the next layer. An important feature of the carousel is its shape. The head does not necessarily need to be going around on a circular track/path around a system axis, but could follow a track that has flat sections as to allow for a generally flat layer deposition on a flat platform, with the ability for the head to be radially displaced to follow such flat section(s) of the path. One can also decide to keep the track circular and simply use curved/arcuate platforms as to simplify the design. Finally, a head size and shape could be geometrically tuned to follow the internal geometries of the contact points between the head and the platforms. One way to imagine this would be to look at how Mazda's Rotary engine fills every internal surface of the casing. Results should be similar whether flat or curved platforms are used but it is important to generate the proper algorithms so as to deposit material and support at the right location and the right time.

A further advantage of the present invention is that the tooling system can include an additional of one of multiple degrees of freedom, like a multiple-bar assembly system, such as a four-bar assembly or the like as a tool displacement mechanism, instead of a cylindrical carousel, following a path about a main system axis.

Still another advantage of the present invention is that the tooling system can be applicable to applications other than 3D printing, with the system tool(s) being scanning head(s), machining/CNC tool(s), post-processing, or pick and place tool(s) instead of printing head(s), for example.

Yet another advantage of the present invention is that the tooling system, when using for example a configuration with four (4) printheads to print six (6) different parts, could use four (4) different colors (CMYK inks for example—cyan, magenta, yellow and key (black)) and print a layer on six different objects per single rotation. The way the layers are printed would be in alternance according to the order of each part. One turn would contain the information of a single layer from all six parts temporally spaced so as to match the correct layer with the correct part (all using a system controller connected to all printheads).

Another advantage of the present invention is that the tooling system can produce multiple parts at the same time using different materials and different additive processes, in conjunction or not. Interestingly, it is also possible to access each platform individually while it is still printing on the other platforms without interruption. The displacement of the printheads or rotational speed of the carousel relative to the platform is what dictates the overall productivity of the machine. Space is optimized for multiple parts and could technically allow the machine to work 24/7. This also means that the time to print a part at full height remains the same no matter the part printed, which is an interesting advantage in SLS, SLA types of additive manufacturing. Printing a small single part on a single platform will take the same time as printing multiple parts in that same volume given that their 2D placement has been optimized. This can be possible if the RPM of the carousel is adjusted to print the maximum area possible during its passage on the different platforms. With the additional platforms available, the productivity is then increased exponentially.

Still a further advantage of the present invention is that the tooling system could also be stacked vertically to allow for a tower of printers to mass produce parts. This type of manufacturing farm could also eventually be used in space, where there is no "up" or "down" as this system has only one printing direction, towards/away from the center (or axis). This is interesting as it decreases the numbers of motors required to rotate the carousel, gaining efficiency in energy consumption and parts used, such as bearings and the likes.

Yet another advantage of the present invention is that the tooling system has the possibility to print disproportionately long parts continuously, given that the "height" or "radial" direction can be infinitely long if the moving axis is designed as such. One can imagine printing long beams or long wings in a single part this way on a conveyor belt for example or printing the support itself adjacent to the printed part.

The tooling system of the present invention could include a plurality of the following features:

A. System tool (printhead or the like) being displaceable by a tool displacement mechanism along a curvilinear closed path about a system axis and located within a working plane intersecting the system axis, with a bed substantially positioned within the working plane locally adjacent the closed path along at least a portion thereof;
  a. Overall assembly
    a1—All orientations possible of the main system tool, although preferably vertical or horizontal
    a2—Sensors and encoders for position accuracy (ex: synchronization of start and end data transfer)
    a3—Possibility of stacking tooling systems (as 3D printers)
    a4—Possibility of part transfer mechanism: to another adjacent printer or ejection after finish
    a5—Contact Pressure mechanism (for example if using SLS, a mechanism could keep the powder from falling by having a panel that slides or rolls along with the head in contact with the part and powder; there would be an opening for the head (laser) to fuse the material during the scan; there could also be a roller to deposit material uniformly; this could also be heated)
  b. Tool displacement mechanism (including system tool/Head)
    b1—One or multiple heads
    b2—Single or Multiple materials or colors (preferably with same printing technology)
    b3—Multiple printing technologies on different heads: SLA, DMLS, SLS, FDM, Electrophotography, etc.
    b4—Can move radially on a track, motorized or any other means (see point c4 hereinbelow: printing platform shape.)
    b5—Multiple heads functions: printing, transferring, scanning, pick and place, machining, etc.
    b6—Head size: total height of the carousel (line) vs partial (additional lateral movement possible)
    b7—Head shape: single point, in-line, staggered (contact points are not at the same angles during rotation; could be angled forward or backward with respect to rotation, V-shaped, or any other shape)
    b8—Position: inside or outside the carousel (ex: laser or projector on top with mirrors instead of the heads)
    b9—Head switching mechanism (ex: switch between additive and subtractive manufacturing heads if not enough space inside)
    b10—Closed displacement path: circular, elliptical, or any other (such as using single/multiple-bar mechanisms), including generally flat portions if needed
    b11—Tools can have adjacent "assistant tool" that can perform other operations such as other additive manufacturing technologies, cleaning, wiping, pushing scanning, machining, or any other assistive function and do not necessarily need to be following the closed path
  c. Bed/Printing platform
    c1—Moves radially away and towards the system axis (center) independently from the displaceable (typically rotating) head(s)
    c2—Single or multiple platforms
    c3—Angle (angular spacing about system axis): equal vs not equal
    c4—Shape: round or flat (or any other suitable shape)
    c5—Can move radially using a belt or printed support system for extreme aspect ratios
    c6—Can move tangentially (2 vectors: lateral or top/down) to allow for printing parts bigger than platform size, and also be angled
    c7—Can allow for automatic part break-off while the other beds are being printed off (Parts can fall off inside a common bin and taken away for example)
  d. Material transfer system
    d1—Position from top, bottom, or using printing platform spaces or in between those, or from the center
    d2—Can transfer liquids (ex: melted plastic) curtain, solids (powder or pellets), film deposition and transfer planes
  e. Power transfer
    e1—For power and/or data transfer
    e2—Wired (contact slip rings) or wireless (inductive)
    e3—Position: typically at center of rotation or anywhere on the rotating carousel
  f. Data exchange
    f1—Type: wired (contact slip rings) vs wireless (Bluetooth, Wi-fi, inductive, etc.)
    f2—Computer location: On and/or Off the displacement mechanism (or rotating carousel)
    f3—Internet/cloud connection
    f4—Screen and user interface (UI) on external computer and/or with external device through a server (laptop, tablet, phone, etc.)
    f5—Slicing software in or out the printer According to an aspect of the present invention there is provided a tooling system comprising:
  a system tool;
  a tool displacement mechanism mounting on a fixed structure and carrying the system tool, the tool displacement mechanism displacing the system tool along a curvilinear closed path about a system axis and located within a working plane intersecting the system axis; and a bed substantially positioned within said working plane locally adjacent the curvilinear closed path along at least a portion thereof.

In one embodiment, the closed path is generally circular and the working plane is generally perpendicular to the system axis.

In one embodiment, the at least a portion of the curvilinear closed path is a generally rectilinear portion.

In one embodiment, the system tool comprises at least one printhead member.

Conveniently, the system tool comprises a counterweight of the at least one printhead member, the counterweight being positioned diametrically opposite the at least one weight relative to the system axis.

In one embodiment, the system tool comprises a plurality of printhead members.

Conveniently, the plurality of printhead members are generally equally spaced from one another along the curvilinear closed path Typically, the curvilinear closed path is generally circular, and the plurality of printhead members are generally equally circumferentially spaced from one another along the circular closed path.

In one embodiment, the system tool is radially displaceable relative to the system axis.

In one embodiment, the bed is connected to the fixed structure, and typically, the bed is radially displaceable relative to the system axis, at least in a direction away from the system axis.

In one embodiment, the system comprises a plurality of beds substantially positioned within said working plane locally adjacent the curvilinear closed path along a respective portion thereof.

In one embodiment, the tool displacement mechanism comprises a bar having opposite first and second ends thereof, the bar rotating about the system axis at the first end, the system tool rotatably mounting on the second end of the bar about a tool axis generally parallel to the system axis.

Conveniently, the tool displacement mechanism comprises a plurality of movement wheels rotating the tool axis rotating the tool axis around the system axis and the system tool about the tool axis.

Typically, the plurality of movement wheels comprises a plurality of sprocket wheels operatively connecting to one another.

Alternatively, the tool system includes a polygonal shape frame defining a first number of tool sides symmetrically positioned around the tool axis, and the fixed structure includes a polygonal shape structure defining a second number of structure sides symmetrically positioned around the system axis.

Conveniently, the second number is larger than the first number, and typically, the second number equals the first number plus one (1).

Alternatively, each one said tool side is generally convex and each one said structure side is generally rectilinear.

Other objects and advantages of the present invention will become apparent from a careful reading of the detailed description provided herein, with appropriate reference to the accompanying drawings.

BRIEF DESCRIPTION OF THE DRAWINGS

Further aspects and advantages of the present invention will become better understood with reference to the description in association with the following Figures, in which similar references used in different Figures denote similar components, wherein:

FIGS. 8a-8e are schematic top plan view of other possible embodiments of a tooling system in accordance with the present invention, similar to the embodiment of FIG. 6 but with different combinations of the quantity of possible printing heads of the system tool and of possible deposition beds of the fixed structure (FIG. 8c representing the embodiment of FIG. 6).

DETAILED DESCRIPTION OF THE INVENTION

With reference to the annexed drawings the preferred embodiments of the present invention will be herein described for indicative purpose and by no means as of limitation.

Figure 1:
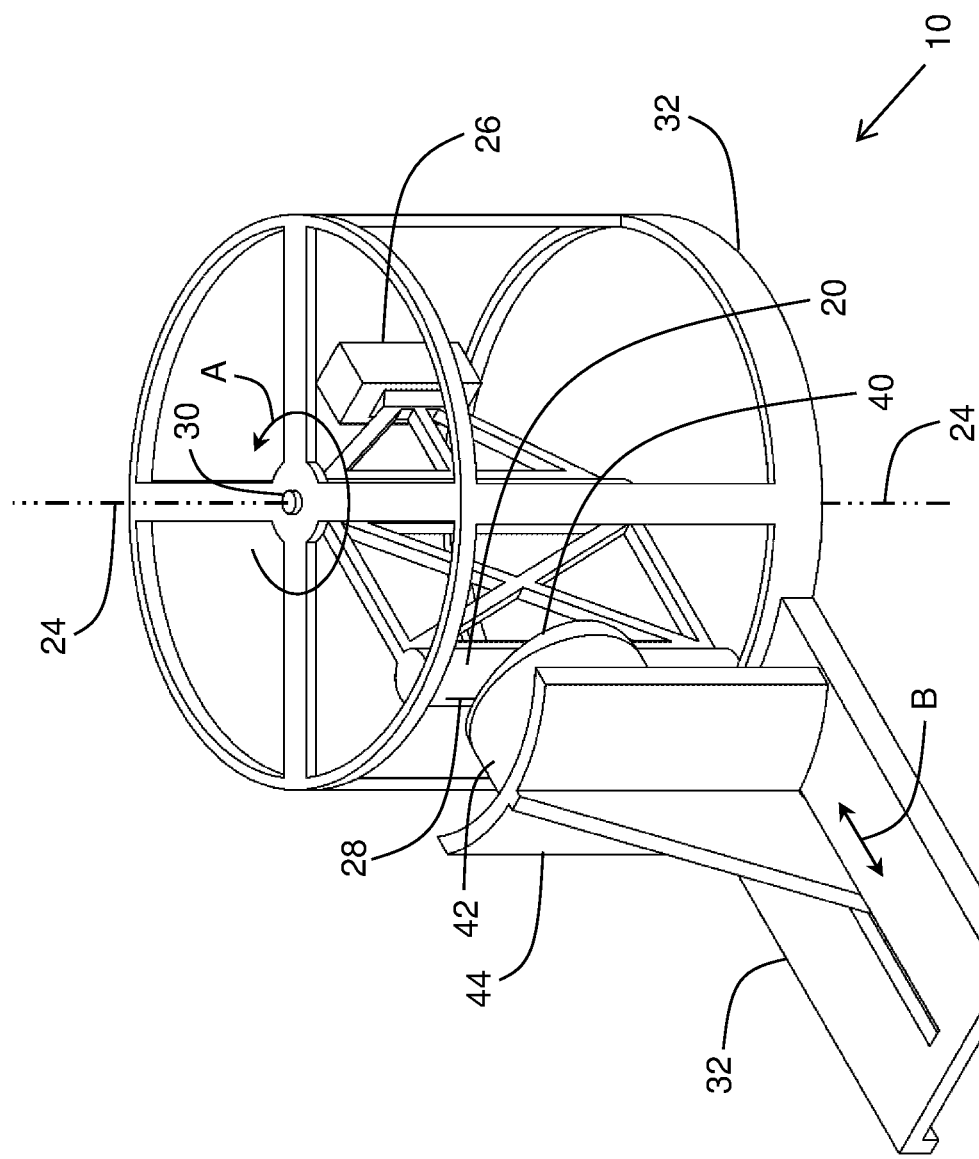
FIG. 1 is a schematic top perspective view of a tooling system in accordance with an embodiment of the present invention, showing a 3D printing system with a displaceable printhead.
Figure 2:
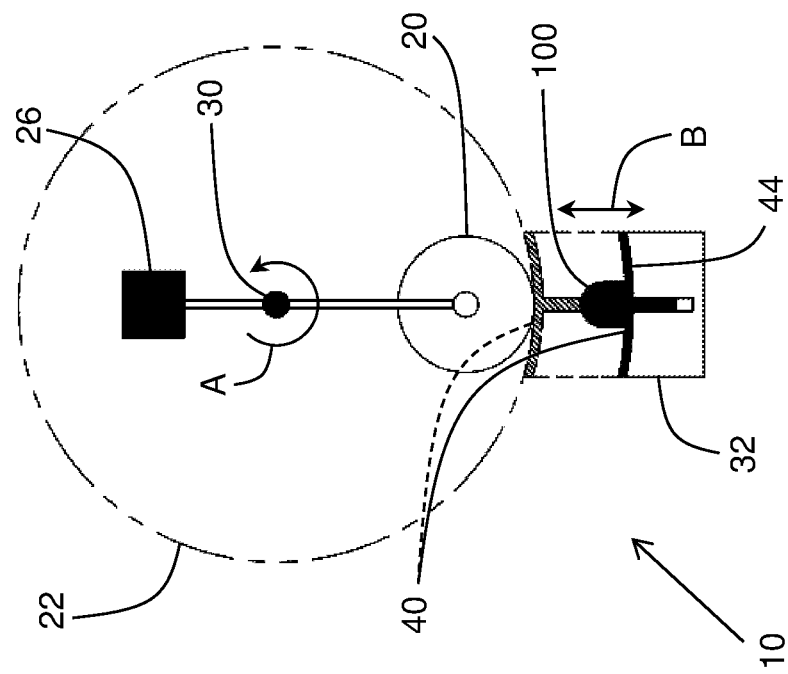
FIG. 2 is a schematic top plan view of the embodiment of FIG. 1, showing the curved printing platform being adjacent/tangential to a section of the closed path along which the printhead is displaced.

Referring to FIGS. 1 and 2, there is schematically shown a tooling system 10 in accordance with an embodiment of the present invention. More specifically, the illustrated tooling system 10 is a 3D printing (or additive manufacturing) system with a displaceable system tool 20 or printhead. One skilled in the art would readily understand that a similar tooling system could be used in different fields than additive manufacturing such as scanners for example, without departing from the scope of the present invention. Accordingly, only for the purpose of a better understanding, the terminology applicable to 3D printers will be preferably used herein below.

The tooling system, or preferably 3D printing system, includes at least one system tool, preferably a printhead 20, carried or supported by a tool displacement mechanism 30, preferably a rotating shaft or carousel (motor not shown), mounted on a fixed structure 32. The shaft 30 displaces the printhead 20 along a curvilinear (i.e. with curved portion(s) and/or rectilinear portion(s), and substantially continuous) closed path 22 (or track, or an effective closed path, or uninterrupted cyclic path) about a system axis 24, or main/printing axis, and located within a working or printing plane generally intersecting (or crossed by) the system axis 24, as illustrated by arrow A. In FIGS. 1 and 2, the closed path 22 is substantially perpendicular to the system axis 24 and has a generally circular shape and encloses the system axis 24. Mechanically, the printhead 20 typically includes a counterweight or mass 26 located radially opposite the printhead 20 relative to the shaft 30 to account for dynamic balance about the shaft 30. Although the embodiment is represented herein with a generally vertical system axis 24, any spatial orientation could be considered without departing from the scope of the present invention, depending on the needs and/or application.

Depending on the application, and type of additive manufacturing, the printhead 20 could widely vary such as being an extruder (FDM), a laser beam (or a projection thereof—SLA), a roller, a transfer plane or belt and the like.

The system 10 includes at least one bed 40, or printing/deposition platform (in any possible spatial orientation), typically independently accessible relative to the operation of the printhead 20, where an object 100 can be printed. In the present embodiment 10, the platform presents a curved or arcuate shape substantially positioned locally adjacent at least a portion of the closed path 22. The platform 40 is also typically positioned within the working plane, and may optionally include a support material 42 that could be removed by a user or automatic post processing technologies using mechanical, chemical, or any other appropriate way. The platform 40 typically includes a plate 44 movable relative to the fixed structure 32 in a radial direction (see arrow B) away from the system axis 24 and the printhead 20 after each successive deposition of material forming the object 100 from each turn of the printhead 20 along the closed path 22. In the example illustrated, more specifically in FIG. 1, the printhead 20 is shown having a linear nozzle 28 or the like to allow deposition of printing material at multiple points across an entire object 100 at each passage of the printhead 20, therefore providing the possibility of 2D scan-printing at each passage.

Figure 3:
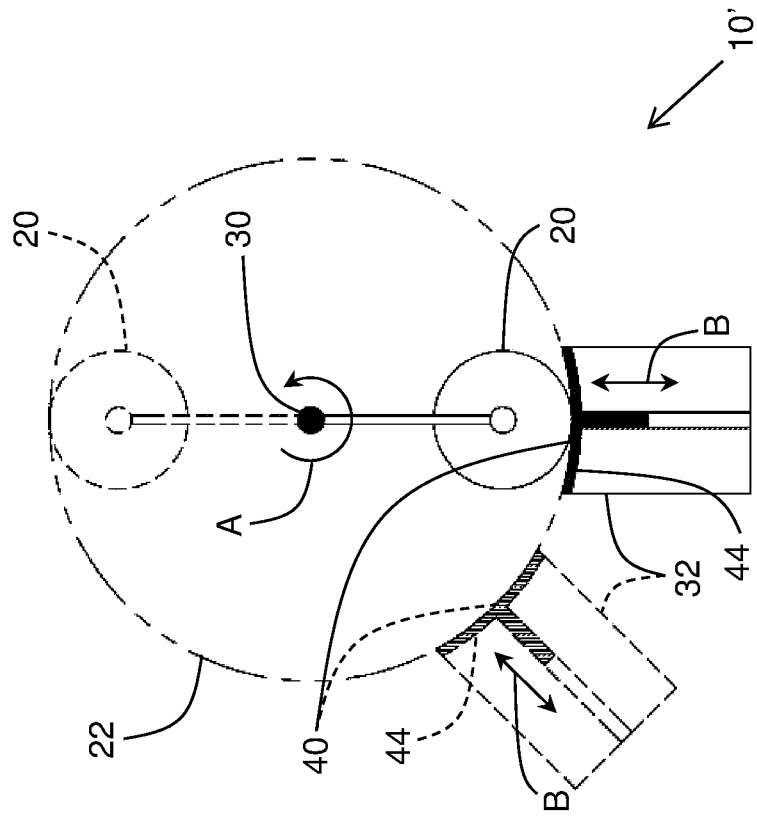
FIG. 3 is a schematic top plan view of another embodiment of a tooling system in accordance with the present invention, showing two radially opposed printheads and two curved printing platforms tangentially adjacent respective portions of the closed path along which the printheads are displaced.

FIG. 3 schematically shows another embodiment 10' of a tooling system in accordance with the present invention similar to the previous embodiment 10 but with a second printhead 20, preferably radially opposed to the other printhead 20, and a second curved printing platform 40 tangentially adjacent a respective portion of the closed path 22 along which the printheads 20 are displaced. Each printhead 20 could be used for both platforms 40, or a respective printhead 20 for each platform 40, depending on the preferred use of and/or what is needed from the system 10'. Such a system 10' could be used to allow for two parts/objects (not shown) to be printed independently using two printing materials or even two different printing processes (SLA or FDM). Both platforms 40 are independently movable.

Figure 5:
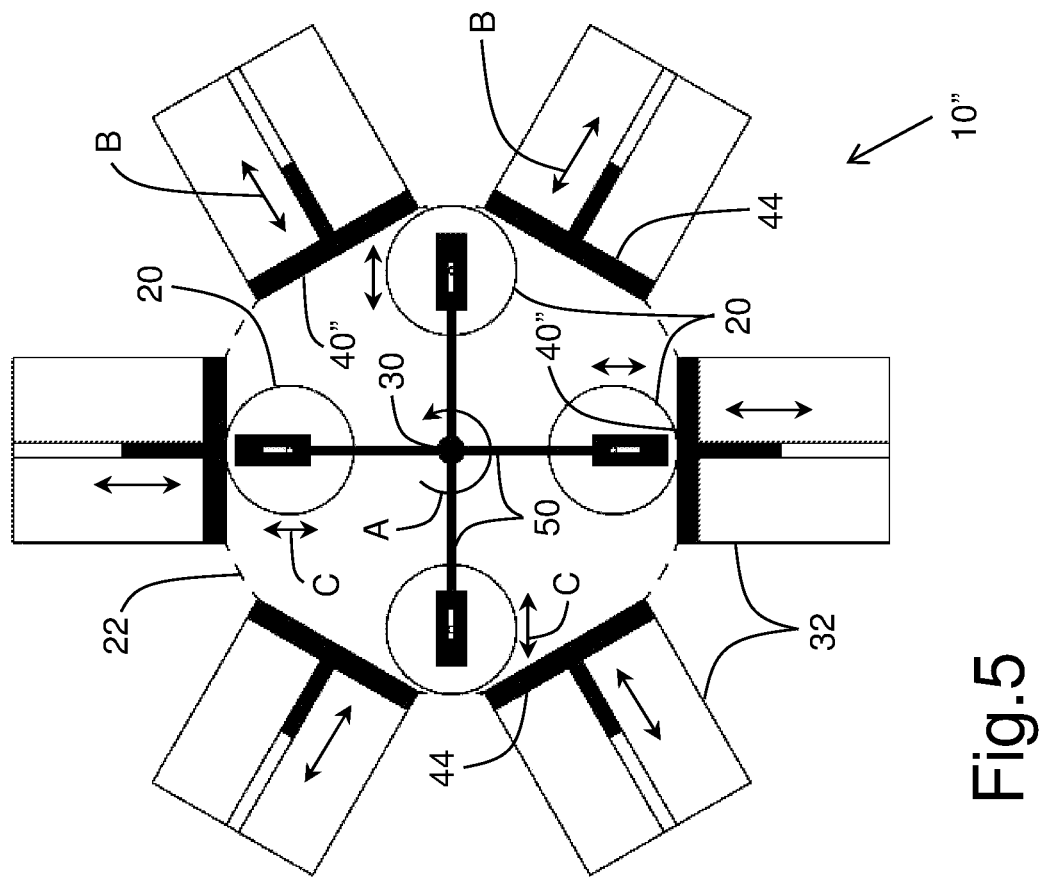
FIG. 5 is a schematic top plan view of another embodiment of a tooling system in accordance with the present invention, showing four radially opposed and angularly equally spaced printheads and six flat printing platforms adjacent respective portions of the closed path along which the printheads are displaced.
Figure 4:
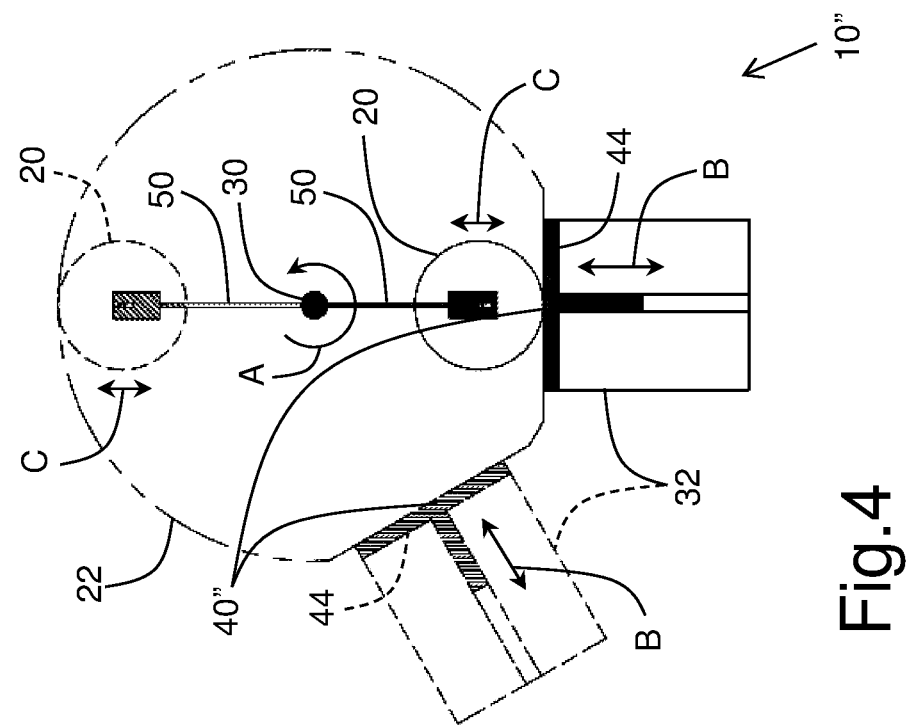
FIG. 4 is a schematic top plan view of another embodiment of a tooling system in accordance with the present invention, showing two radially opposed printheads and two flat printing platforms adjacent respective portions of the closed path along which the printheads are displaced.

Now referring more specifically to FIGS. 4 and 5, there is schematically shown another embodiment 10" of a tooling system in accordance with the present invention similar to the previous embodiment 10' but with two generally flat beds 40" and two radially movable printheads 20 (see arrows C), and with six generally flat beds 40" and four radially movable printheads 20, respectively. The printheads 20 are preferably equally circumferentially spaced apart from one another, and similarly for the platforms 40", such that there is a substantially uniform time gap between successive passages of printheads 20 in front of a same platform 40'" (with a substantially continuous displacement of the printheads 20 along the closed path 22). Platforms 40 and printheads 20 are all independently movable.

In this embodiment, the local (along portion(s) of the axisymmetric closed path 22) radial displacement of the printhead 20 along a respective tool support radial arm 50 allows the printhead to be displaced along generally flat portion(s) of the path if needed, depending on the object(s) being printed on the different platforms 40".

Similarly, the printhead(s) 20 could also be independently displaced in an axial direction (generally parallel to the system axis 24) such that the working plane could continuously vary and have different angles relative to the system axis 24, depending on the specific needs.

In the above embodiments 10, 10', 10", the closed path 22 is generally axisymmetric about the system axis 24, but, with other types of tool displacement mechanisms (such as four-bar mechanisms or the like), the closed path 22 could have any irregular shape (not shown), including, but not preferred (since it implies to always fight against dynamic inertia of the printhead(s) 20), repetitive back-and-forth displacements along an arc and the like, without departing from the scope of the present invention.

Now referring more specifically to FIGS. 6 and 7a-7d, there is schematically shown another embodiment 10'" of a tooling system in accordance with the present invention, in which the tool displacement mechanism 30 includes a one-bar link 34 (although a multiple-bar link could alternatively be considered) between the fixed structure 32 (shown partially broken and in stippled lines in FIGS. 7a-7d for illustrative purposes only, and to ease the comprehension by illustrating hidden details) and the system tool 20'". The bar 34 has a first longitudinal end 36 rotatably mounted about the system axis 24, and an opposite second longitudinal end 38 rotatably mounted about a tool axis 60 that is generally parallel and spaced (by the bar 34) from the system axis 24. the tool displacement mechanism 30 typically further includes a plurality of movement wheels 62, such as sprocket wheels, pulleys or the like mechanism (a separate single motor to independently rotate the system tool 20'" could be an option for example) to ensure the proper rotational displacement of the printhead carousel 20 about the tool axis 60 (as illustrated by arrow A') when the tool axis 60 is rotated about the system axis 24 via the bar 34 and the movement wheels 62 (as illustrated by arrow A). The illustrated printhead carousel 20 has, within a working plane, a polygonal shape frame defining a first (internal—since the carousel 20 is located within the fixed structure 32, or radially between the fixed structure 32 and the system axis 24) number of tool sides 21 for printheads or the like, that are symmetrically positioned around the tool axis 60. The fixed structure 32 includes a polygonal shape structure defining a second (external—since the fixed structure 32 is located around and outside the carousel 20, or radially away from the carousel relative to the system axis 24) number of structure sides 33, for beds 40, printing material supply or the like, symmetrically positioned around the system axis 24.

Figure 6:
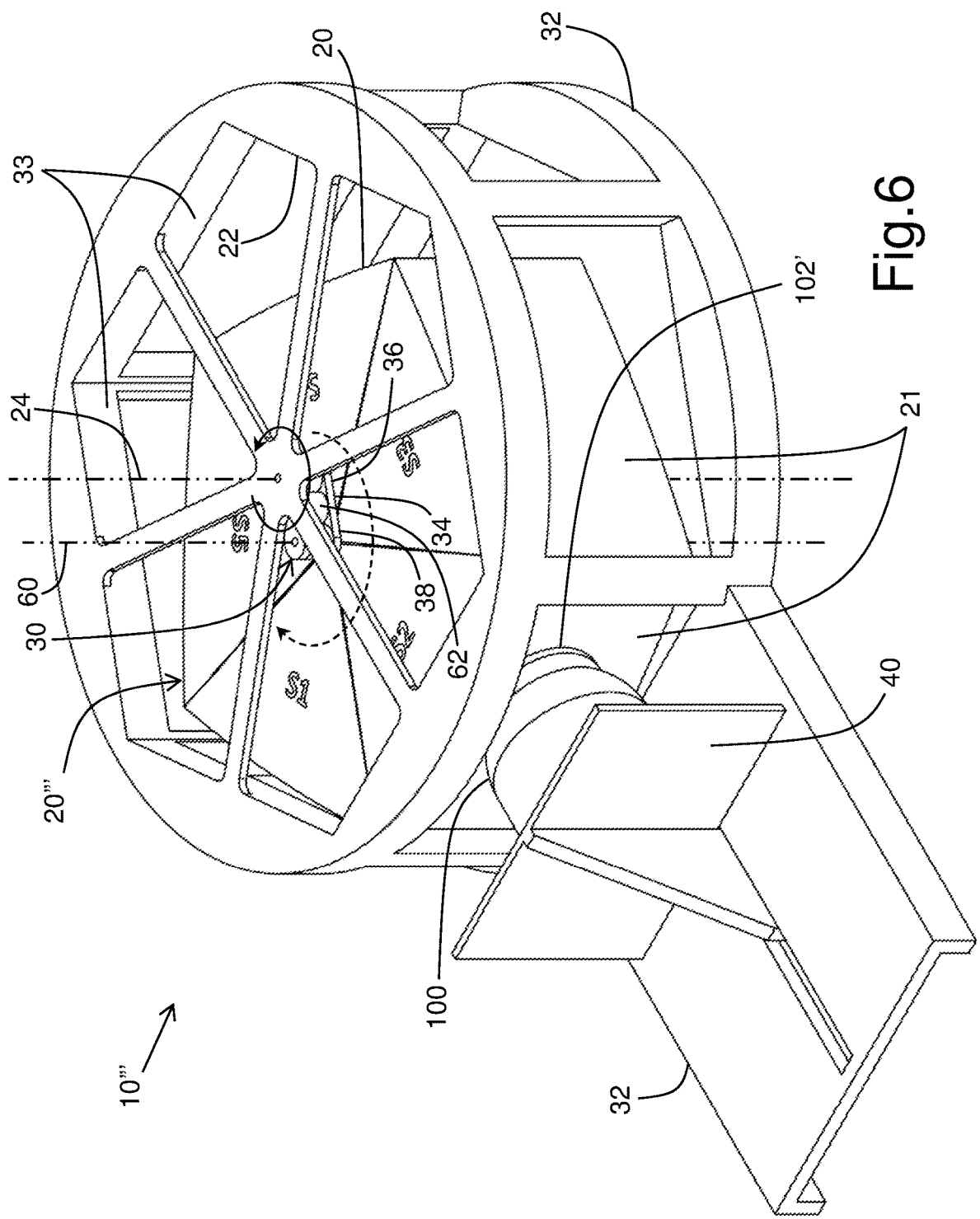
FIG. 6 is a schematic top perspective view of another embodiment of a tooling system in accordance with the present invention, showing a system tool with a possibility of five (5) printing heads and having a tool axis parallel and spaced from the system axis via the tool displacement mechanism including a bar having its ends linking to the system axis and the tool axis.
Figure 7A:
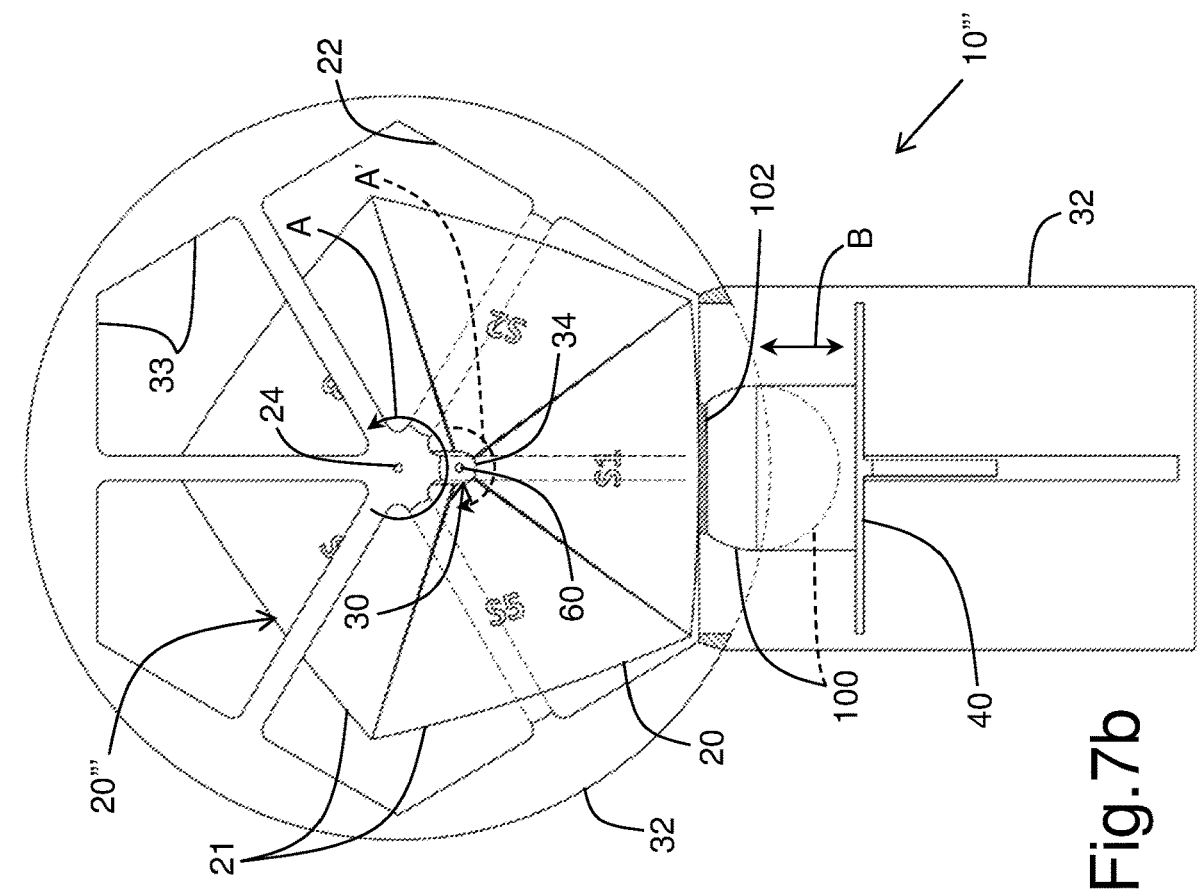
FIGS. 7a-7d are schematic top plan view of the embodiment of FIG. 6, showing different steps of the displacement of the printing heads of the system tool.
Figure 7B:
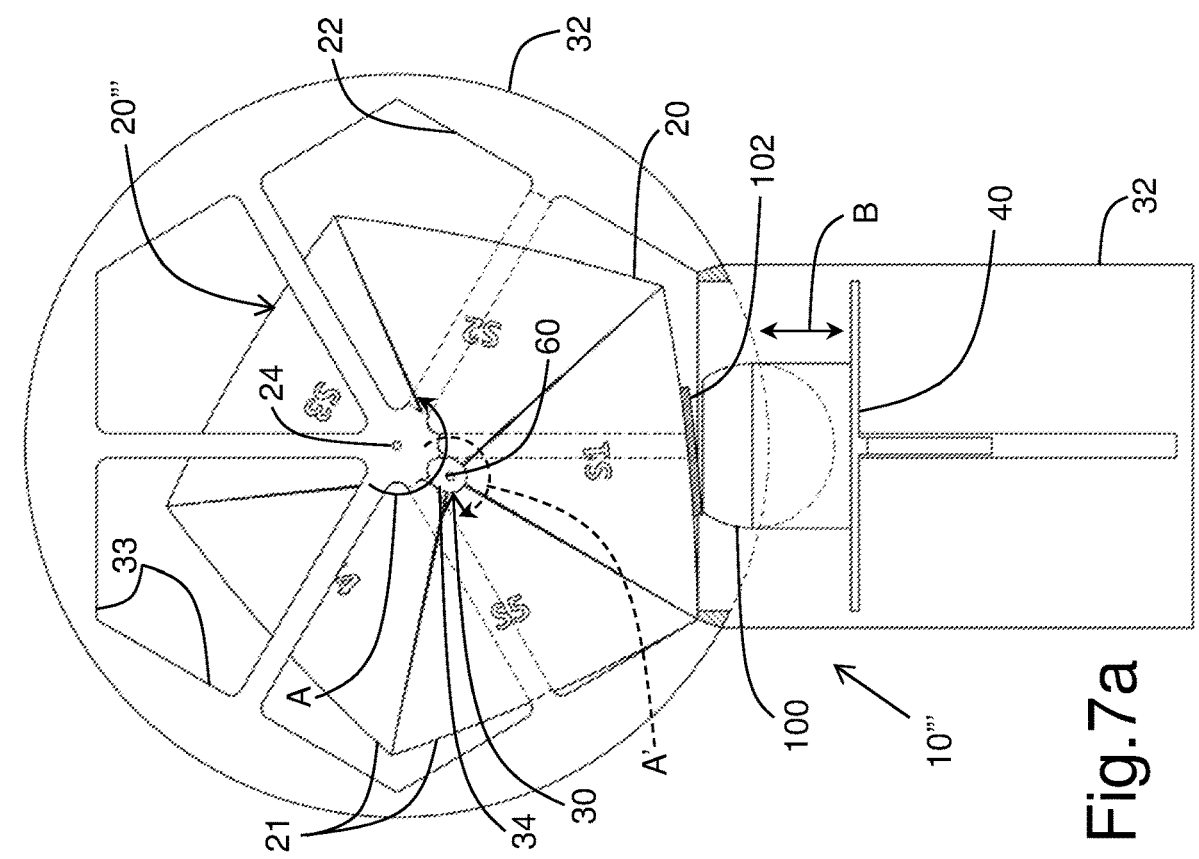
Figure 7C:
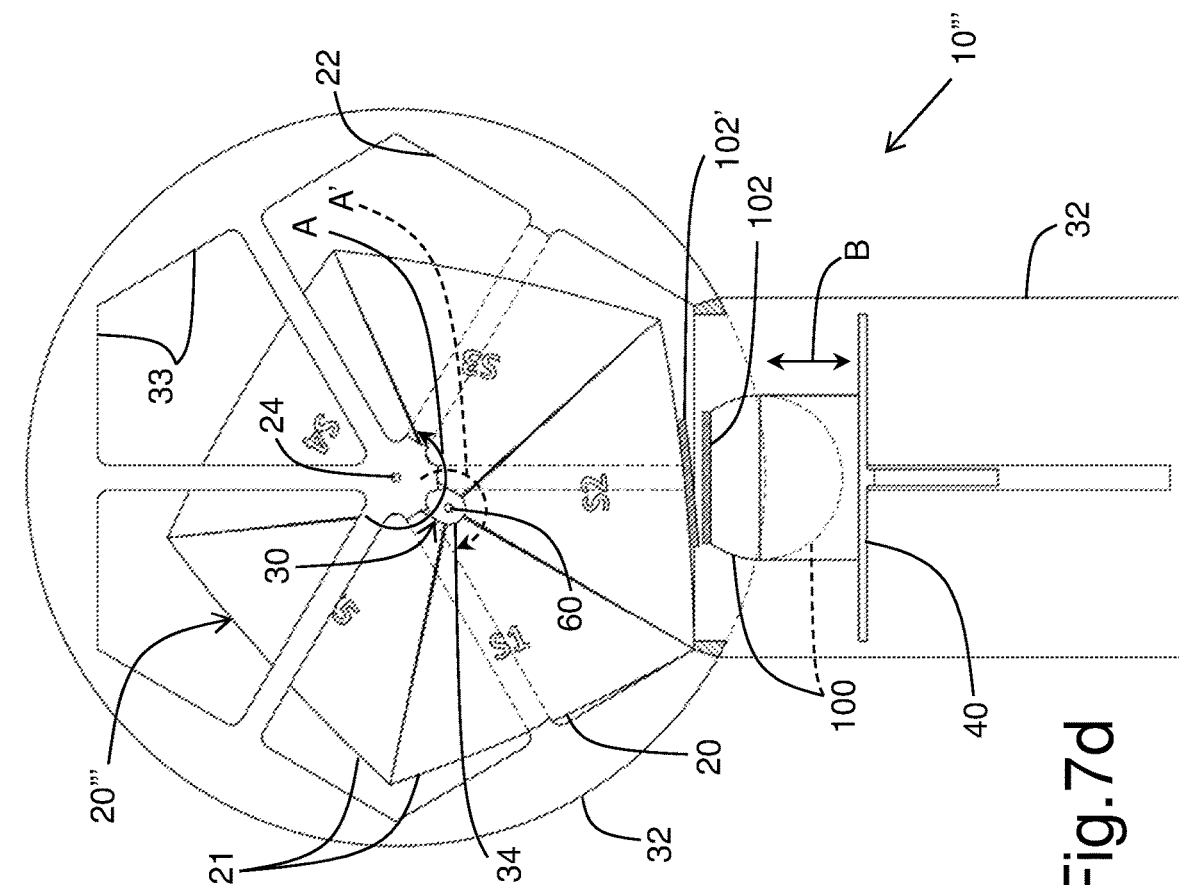
Figure 7D:
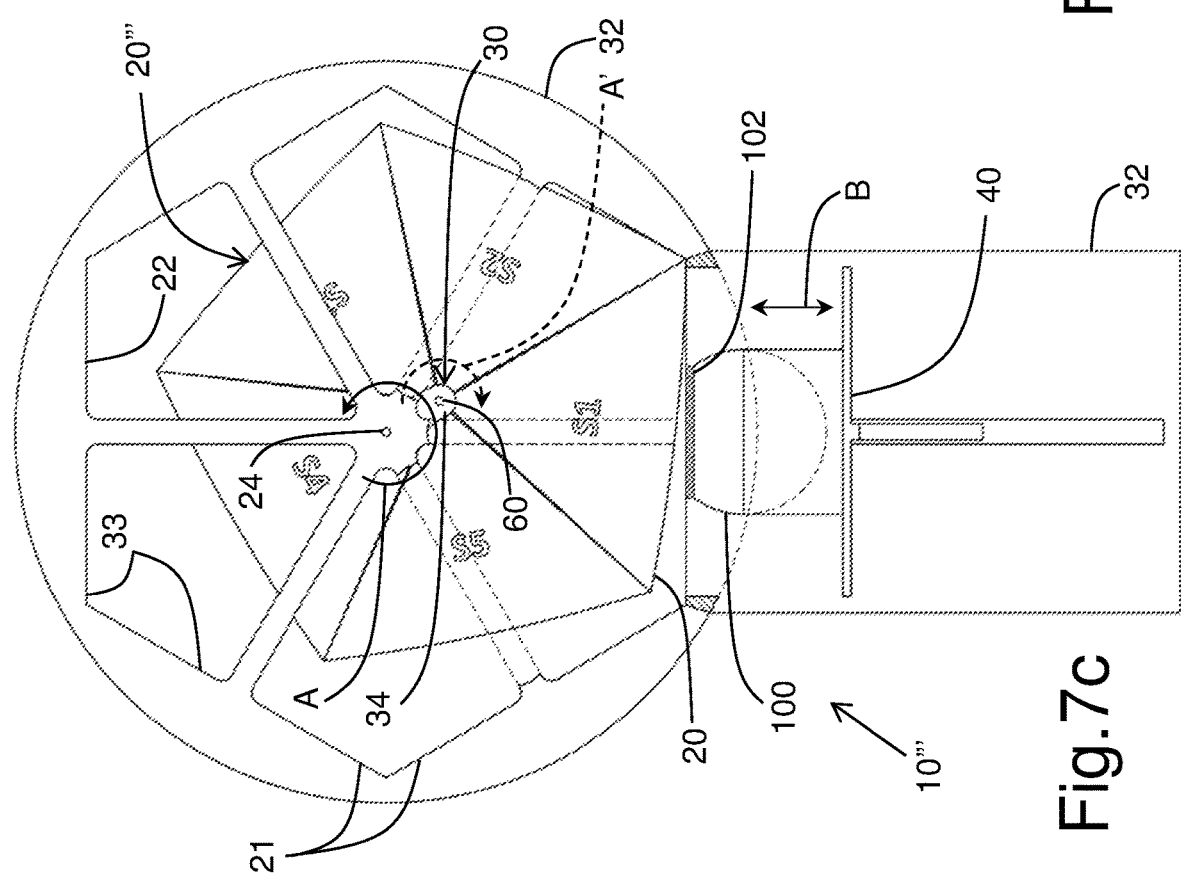

Each tool sides 21, represented in FIGS. 6-7*d* by a generally flat or slightly convex free surface spaced and substantially parallel to the tool axis 60, is a printing or transferring surface associated with a respective one of the triangular portions S1, S2, S3, S4, S5 of the carousel 20. Each triangular portion could include a printhead when the printing medium is "generated" or comes from the carousel 20, or a transfer head when the printing medium is "generated" or comes from outside the carousel 20. In the latter case, as a non-limiting example, the printing medium can be transferred to the transferring surface via at least one of the opened structure sides 33.

In other words, one skilled in the art would readily understand that at least one of the structure sides 33 could be a printing material supply in the case of at least one the tool side 21 carrying a transfer tool (to transfer the printing material received from the supply and apply it onto an object being printed).

As illustrated in FIGS. 7*a*-7*c*, the printhead tool side 21 of the triangular portion S1 successively deposit (or print), from left to right a layer 102 forming the object 100. And FIG. 7*d* shows the next layer 102' being deposited (or printed) forming the object 100, via the next following printhead tool side 21 of the triangular portion S2. In this example, just after the layer 102 is deposited in FIG. 7*c*, the printhead of tool side 21 of the triangular portion S2 could get (immediately after) the following layer 102' transferred thereon from the next opened structure side 33, before it is ultimately transferred onto the object 100 thereafter, as shown in FIG. 7*d*, after the printhead carousel 20 has completed a full rotation (360°) about the system axis 24 via the tool displacement mechanism 30.

In the illustrated embodiment 10''', the second number of structure sides 33 is larger than the first number of tool sides 21, and more specifically equals to first number of tool sides 21 plus one (1). For instance, the first number of tool sides 21 is five (5) since the internal polygon shape of the carousel 20 is a pentagon, and the second number of structure sides 33 is six (6) since the external polygon shape of the fixed structure 32 is a hexagon. In this embodiment 10''', the closed path 22 is essentially the hexagonal shape of the fixed structure 32, and it takes five (5) complete rotations of the printhead carousel 20 about the system axis 24 (via the tool displacement mechanism 30) to have any tool side 21 of the carousel 20 to complete a single effective closed path 22 of the closed trajectory delimited by the fixed structure 32 (such as for the printhead of tool side 21 of the triangular portion S1 to start from a position facing the object 100 and get back to that same position).

Although different combinations are possible concerning the shapes of the tool sides 21 and structure sides 33, depending on the use and needs of the tooling system 10''', it is preferable that the tool sides are typically generally convex (arcuate) in shape in order to smoothly match, without sliding, the typically rectilinear structure sides 33 where objects are being printed on respective beds 40. The actual profiles of each one of the tool sides 21 and structure sides 33 depend on the actual relative dimensions of both the printhead carousel 20 and the fixed structure 32, as well as the distance between the tool axis 60 and the system axis 24.

The table below provides for a non-limiting list of such possible different combinations in the first (internal) and second (external) polygon counts or number for a tooling system similar to the embodiment 10'''. It is noted that the example represented in FIG. 8*c* is the embodiment 10'''.

| Internal Polygon Count | External Polygon Count | Sketch representation |
| --- | --- | --- |
| 3 | 4 | See FIG. 8a |
| 4 | 5 | See FIG. 8b |
| 5 | 6 | See FIG. 8c |
| 5 | 7 | See FIG. 8d |
| 7 | 10 | See FIG. 8e |

Although not illustrated, it is noted that in cases where both first and second numbers are even numbers, half (every other two) of the triangular portions associated with the tool sides 21 will only be operative with (print, deposit, or transfer on/from) a respective half (every other two) of the structure sides 33. And the other half of the triangular portions associated with the tool sides 21 will only be operative with the other half of the structure sides 33. In such cases, the effective closed path 22 of each tool side 21 of the system tool 20 is limited to half of the possible closed trajectory defined by the fixed structure 32.

Similarly, although not illustrated, it is also noted that in cases where the second number equals to N times the first number (N being an integer), each triangular portion associated with a tool side 21 will only be operative with a respective N number of structure sides 33 equally spaced from one another. In such cases, the effective closed path 22 of each tool side 21 of the system tool 20 is limited to 1/N portion of the possible closed trajectory defined by the fixed structure 32.

Notwithstanding the shape of the path 22, the displacement of each printhead 20 along its respective support arm 50 can be performed in different ways known in the art, namely mechanically using a pin-guiding tracking slot, cam/spring arrangements, or electrically using motors linked to a system controller, or such as purpose-designed wheel which can follow the path and keep the tool in contact with the platforms, as examples. Between adjacent platforms 40, 40'', 40''' the closed path 22 would typically have a shape that minimizes and/or smoothens the overall radial displacement of the printheads 20 there between.

Although not specifically illustrated herein, there exist multiple ways to transmit power and data to a controller/computer with wireless communication capabilities onboard the carousel or moving frame/printheads 20 of the tooling system 10, 10', 10'', 10'''. External material feeding systems (not shown) must also be used. The preferably controller/computer onboard could receive and send instructions and data wirelessly or by use of sliding electrical contacts to another adjacent computer or control system, or any other known method. Electric power can be transferred to the computer and other electrical components wirelessly or by the use of appropriate electrical contacts (slip rings or coupled coils for example) or any other known method. The center (or system tool) of the machine or tooling system is a critical place subject to important design considerations as it is the optimal position where information, power, and material can pass through.

An adjacent material feeding system (not shown) shall be used to displace materials (top, bottom, or taking a platform space, or in-between) to the printhead during each or any rotation of the carousel 20 depending on the specific needs (as exemplified in the above description of the embodiment 10''' of FIGS. 6-7*d*).

Sensors can be used on the start and/or end side of each platform to sync the start signal of deposited material as well as perform self-checks aimed at the control and regulation of the rotation of the carousel or the displacement of the printheads 20. Similarly, the tooling system can include one or a multiple of controller (not shown) depending on the specific needs, typically connected to one another via wireless links or the like.

One ordinary skilled in the art would readily understand that the arcuate sections of the circular closed path 22 as illustrated in the embodiments 10, 10' of FIGS. 1-3, or the almost circular closed path 22 as illustrated in the embodiments 10" of FIGS. 4-5, could be considered as having effectively an infinite number of rectilinear portions.

Although the present invention has been described with a certain degree of particularity, it is to be understood that the disclosure has been made by way of example only and that the present invention is not limited to the features of the embodiments described and illustrated herein, but includes all variations and modifications within the scope of the invention as hereinafter claimed.

I claim:

1. An additive manufacturing system comprising:
   a system tool;
   a tool displacement mechanism mounted on a fixed structure and carrying the system tool, the tool displacement mechanism displacing the system tool along a curvilinear closed path about a system axis of the tool displacement mechanism, the curvilinear closed path being within a working plane;
   at least one platform located outside of the curvilinear closed path, the at least one platform being movable relative to the fixed structure in a radial direction perpendicular to the system axis; and
   wherein the system tool is operable, while being displaced within the curvilinear closed path, so as to fabricate a part in a layer-by-layer manner.

2. The additive manufacturing system of claim 1, wherein the curvilinear closed path is generally circular.

3. The additive manufacturing system of claim 1, wherein at least a portion of the curvilinear closed path is generally rectilinear.

4. The additive manufacturing system of claim 1, wherein the system tool comprises at least one printhead member.

5. The additive manufacturing system of claim 4, wherein the system tool comprises a counterweight to the at least one printhead member, the counterweight being positioned diametrically opposite the at least one printhead member relative to the system axis.

6. The additive manufacturing system of claim 1, wherein the system tool comprises a plurality of printhead members.

7. The additive manufacturing system of claim 6, wherein the plurality of printhead members are generally equally spaced from one another along the curvilinear closed path.

8. The additive manufacturing system of claim 7, wherein the curvilinear closed path is generally circular and the plurality of printhead members are generally equally circumferentially spaced from one another along the circular curvilinear closed path.

9. The additive manufacturing system of claim 1, wherein the system tool is radially displaceable relative to the system axis.

10. The additive manufacturing system of claim 1, wherein the at least one platform is connected to the fixed structure.

11. The additive manufacturing system of claim 1, wherein the radial direction is away from the system axis.

12. The additive manufacturing system of claim 1, wherein the at least one platform comprises a plurality of platforms.

13. The additive manufacturing system of claim 1, wherein the tool displacement mechanism comprises a bar having opposite first and second ends, wherein the bar is capable of rotating about the system axis at the first end and the system tool is rotatably mounted on the second end of the bar and configured to rotate about a tool axis generally parallel to the system axis.

14. The additive manufacturing system of claim 13, wherein the tool displacement mechanism comprises a plurality of movement wheels rotating the tool axis around the system axis and the system tool about the tool axis.

15. The additive manufacturing system of claim 14, wherein the plurality of movement wheels comprises a plurality of sprocket wheels operatively connecting to one another.

16. The additive manufacturing system of claim 13, wherein the system tool includes a polygonal shape frame defining a first number of tool sides symmetrically positioned around the tool axis; and the fixed structure includes a polygonal shape structure defining a second number of structure sides symmetrically positioned around the system axis.

17. The additive manufacturing system of claim 16, wherein the second number is larger than the first number.

18. The additive manufacturing system of claim 16, wherein the second number equals the first number plus one.

19. The additive manufacturing system of claim 17, wherein each of the tool sides symmetrically positioned around the tool axis is generally convex and each of the structure sides symmetrically positioned around the system axis is generally rectilinear.

* * * * *